US008846857B2

(12) United States Patent
Duff et al.

(10) Patent No.: US 8,846,857 B2
(45) Date of Patent: Sep. 30, 2014

(54) SOLUTION PHASE PROCESSING OF POLYARYLENE SULFIDE

(71) Applicant: E I Du Pont De Nemours and Company, Wilmington, DE (US)

(72) Inventors: Robert John Duff, Newark, DE (US); Zheng-Zheng Huang, Wilmington, DE (US); Joachim C Ritter, Wilmington, DE (US); Joel M Pollino, Johns Creek, GA (US)

(73) Assignee: E I du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 13/644,524

(22) Filed: Oct. 4, 2012

(65) Prior Publication Data

US 2014/0097134 A1    Apr. 10, 2014

Related U.S. Application Data

(63) Continuation-in-part of application No. PCT/US2012/056741, filed on Sep. 21, 2012.

(60) Provisional application No. 61/537,194, filed on Sep. 21, 2011.

(51) Int. Cl.
*C08F 6/00* (2006.01)
*C08G 75/14* (2006.01)
*C08J 3/00* (2006.01)

(52) U.S. Cl.
CPC .................................... *C08G 75/14* (2013.01)
USPC ............................ 528/480; 528/488; 528/491

(58) Field of Classification Search
USPC .......................................... 528/480, 488, 491
See application file for complete search history.

(56) References Cited

U.S. PATENT DOCUMENTS

| | | | |
|---|---|---|---|
| 3,405,073 A | 10/1968 | Abramoff | |
| 3,489,702 A | 1/1970 | Abramoff | |
| 3,519,598 A | 7/1970 | Larsen | |
| 4,373,091 A | 2/1983 | Edmonds | |
| 4,411,853 A | 10/1983 | Reed et al. | |
| 4,413,081 A | 11/1983 | Mathis et al. | |
| 4,418,029 A | 11/1983 | Reed et al. | |
| 4,426,479 A | 1/1984 | Deguchi et al. | |
| 4,535,117 A | 8/1985 | Mathis et al. | |
| 4,952,624 A | 8/1990 | Koehler et al. | |
| 5,045,629 A | 9/1991 | Nesheiwat | |
| 5,149,749 A | 9/1992 | Blackwell et al. | |
| 5,187,496 A | 2/1993 | Yu | |
| 5,650,459 A | 7/1997 | Satake et al. | |
| 5,723,542 A | 3/1998 | Hwang et al. | |
| 5,789,533 A | 8/1998 | Yamanaka et al. | |
| 6,093,760 A | 7/2000 | Nishihara et al. | |
| 6,375,789 B1 | 4/2002 | Katz et al. | |
| 6,608,136 B1 | 8/2003 | Dean et al. | |
| 6,670,034 B2 | 12/2003 | Boyd et al. | |
| 7,771,646 B2 | 8/2010 | Clauss et al. | |
| 2002/0183424 A1 | 12/2002 | Duvall et al. | |
| 2005/0256234 A1 | 11/2005 | Kurumatani et al. | |
| 2005/0258404 A1 | 11/2005 | McCord | |
| 2009/0188379 A1 | 7/2009 | Hiza et al. | |
| 2010/0044599 A1 | 2/2010 | McCord | |
| 2014/0087117 A1 | 3/2014 | Duff et al. | |

FOREIGN PATENT DOCUMENTS

| | | | |
|---|---|---|---|
| EP | 173305 A1 | | 3/1985 |
| EP | 343109 B1 | | 1/1994 |
| JP | 1-306426 | * | 6/1988 |
| JP | 02281078 A | | 11/1990 |
| JP | 02286747 A | | 11/1990 |
| JP | 2001294866 A | | 10/2001 |
| JP | 2007227099 A | | 9/2007 |
| WO | 2011119543 A2 | | 9/2011 |

OTHER PUBLICATIONS

Allen et al Polymer Degradation and Stability 13 (1985) 191-200.
PCTUS2011/029335 International Search Report Korean Intellectual Property Office Seo-gu Daejeon Republic of Korea Authorized Officer Park Hamyong Nov. 29, 2011 for commonly-assigned application.
Co-pending application published as US-2013-0012638-A1, filed Mar. 16, 2011.
Co-pending application published as US-2013-0012637-A1, filed Mar. 21, 2011.
Co-pending application published as US-2013-0012092-A1, filed Mar. 22, 2011.
Co-pending application published as US-2013-0011544-A1, filed Mar. 16, 2011.
Co-pending application published as US-2013-0012671-A1, filed Mar. 22, 2011.
Co-pending application published as US-2013-0009333-A1, filed Mar. 17, 2011.

(Continued)

*Primary Examiner* — Terressa Boykin

(57) ABSTRACT

Provided are methods for obtaining modified polyarylene sulfide compositions having improved thermal and thermo-oxidative stability, the compositions so obtained, and articles comprising the compositions. The method comprises the steps of contacting, in the presence of a suitable solvent, a polyarylene sulfide with at least one reducing agent and at least base to form a first mixture. The reducing agent comprises zinc(0), tin(0), tin(II), bismuth (0), bismuth(III), or a combination thereof. The first mixture is heated to form a second mixture in which the polyarylene sulfide is dissolved. The polyarylene sulfide is then precipitated to obtain a modified polyarylene sulfide.

15 Claims, 2 Drawing Sheets

(56) References Cited

OTHER PUBLICATIONS

Co-pending application published as US-2013-0005889-A1, filed Mar. 23, 2011.
Co-pending application published as US-2013-0005890-A1, filed Mar. 22, 2011.
Co-pending application published as US-2013-0018134-A1, filed Mar. 22, 2011.
Lin, K.-H et al, Chemical Engineer'S Handbook, 5th Edition (1973) Chapter 4, McGraw Hill (Book, Not Enclosed).
Office action dated Mar. 29, 2013 for copending U.S. Appl. No. 13/635,025.
Final office action dated Oct. 30, 2013 for copending U.S. Appl. No. 13/635,025.
Office action dated Nov. 5, 2013 copending U.S. Appl. No. 13/634,969.
Office action dated Nov. 5, 2013 copending U.S. Appl. No. 13/635,913.
Office action dated Nov. 6, 2013 for copending U.S. Appl. No. 13/634,887.
Office action dated Nov. 20, 2013 for copending U.S. Appl. No. 13/636,136.
Office action dated Jan. 3, 2014 for copending U.S. Appl. No. 13/636,233.
Office action dated Sep. 4, 2013 for copending U.S. Appl. No. 13/634,697.
Final Office action dated Jan. 15, 2014 for copending U.S. Appl. No. 13/634,697.
Advisory Action dated Feb. 6, 2014 for copending U.S. Appl. No. 13/634,697.
Office action dated Oct. 22, 2013 for copending U.S. Appl. No. 13/628,745.
Co-pending U.S. Appl. No. 14/345,720, filed 19/21/2012.
International Search Report, Corresponding International Patent Application PCT/US2012/056741, Mailed Feb. 26, 2013.
Co-Pending International Patent Application PCT/US2011/29335 (Joachim C. Ritter et al., Filed Mar. 22, 2011), Published as WO2011/119543 Jan. 19, 2012.
Office action dated Mar. 20, 2014 for copending U.S. Appl. No. 13/634,697.

* cited by examiner

1

SOLUTION PHASE PROCESSING OF POLYARYLENE SULFIDE

This application claims benefit of priority from PCT/US12/156,741 filed on Sep. 21, 2012.

FIELD OF THE INVENTION

This invention relates to polyarylene sulfide compositions and to methods of stabilizing them.

BACKGROUND

In applications such as the production of fibers, films, nonwovens, and molded parts from polyarylene sulfide resins, it is desirable that the viscosity and molecular weight of the polymer resin remain substantially unchanged during processing of the polymer. In addition, it is desirable for the polyarylene sulfide resin to contain a minimal amount of volatile components as it is well known that volatile components of polymer compositions can have a negative impact on polymer processing.

Various procedures have been utilized to stabilize polyarylene sulfide compositions such as polyphenylene sulfide (PPS) against changes in physical properties during polymer processing.

U.S. Pat. No. 5,235,034 discloses that poly(arylene sulfide/sulfone) polymers are treated in order to increase melt stability and decrease impurities by contacting the poly(arylene sulfide/sulfone) polymer with a soluble zinc compound and an acidic solution.

U.S. Pat. No. 5,789,533 discloses that a zinc compound is added to a polymer slurry in a polymerization system or in an aftertreatment step a pH of which slurry as determined [in the specification] is set in a range of from 12.5 to 10.5. The reference further discloses an embodiment of the invention where polyarylene sulfide is treated with a zinc compound in aftertreatment, a zinc compound (or its solution) is preferably added to a polymer slurry obtained after the polymerization, and stirred at 30° C. to 270° C. for 10 minutes to 1 hour. Then, the polyarylene sulfide is separated and purified in a conventional manner, and preferably, further treated with an acid.

WO 2009/060524 discloses a process of subjecting a polyphenylene sulfide resin to acid treatment and thermal oxidation successively to produce a polyphenylene sulfide resin having specified properties, including (1) the quantity of gas vaporizing in heat-melting the resin under vacuum at 320° C. for 2 hours is 0.3 wt % or below.

Polyarylene sulfide compositions exhibiting improved thermal and/or thermo-oxidative stability and reduced volatile content continue to be sought, as are methods to provide improved thermal and/or thermo-oxidative stability to polyarylene sulfide compositions having reduced volatile content, especially polyphenylene sulfide compositions.

SUMMARY

Described herein are methods for solution phase processing of polyarylene sulfides, including polyphenylene sulfides, to obtain modified polyarylene sulfides having improved thermo-oxidative stability. Also described herein are the modified polyarylene sulfide compositions obtained by the present methods, as well as articles comprising the modified polyarylene sulfides.

In one aspect, a process is described, the process comprising the steps of a) contacting, in the presence of a suitable solvent, a polyarylene sulfide with at least one reducing agent and at least one base to form a first mixture, wherein the reducing agent comprises zinc(0), tin(0), tin(II), bismuth (0), bismuth(III), or a combination thereof, and the ratio of the reducing agent to the polyarylene sulfide is from about 0.0001:1 to about 0.5:1 on a weight basis;

b) heating the first mixture to a sufficient temperature and for a sufficient time to form a second mixture wherein the polyarylene sulfide is dissolved in the solvent; and c) precipitating the dissolved polyarylene sulfide from the second mixture to obtain a modified polyarylene sulfide having improved thermo-oxidative stability relative to the thermo-oxidative stability of the polyarylene sulfide of step a) measured under the same conditions.

In one embodiment, in step a) the polyarylene sulfide is additionally contacted with at least one compound comprising zinc(II), tin(II), tin(IV), bismuth(V), antimony(III), antimony(V), or a combination thereof, and wherein the ratio of the compound to the polyarylene sulfide is from about 0.0001:1 to about 0.5:1 on a weight basis.

In one aspect, modified polyarylene sulfides, including modified polyphenylene sulfides, are obtained by the methods described herein.

In one aspect, articles comprising the modified polyarylene and polyphenylene sulfides are described.

DETAILED DESCRIPTION OF THE INVENTION

Definitions

Figure 1:
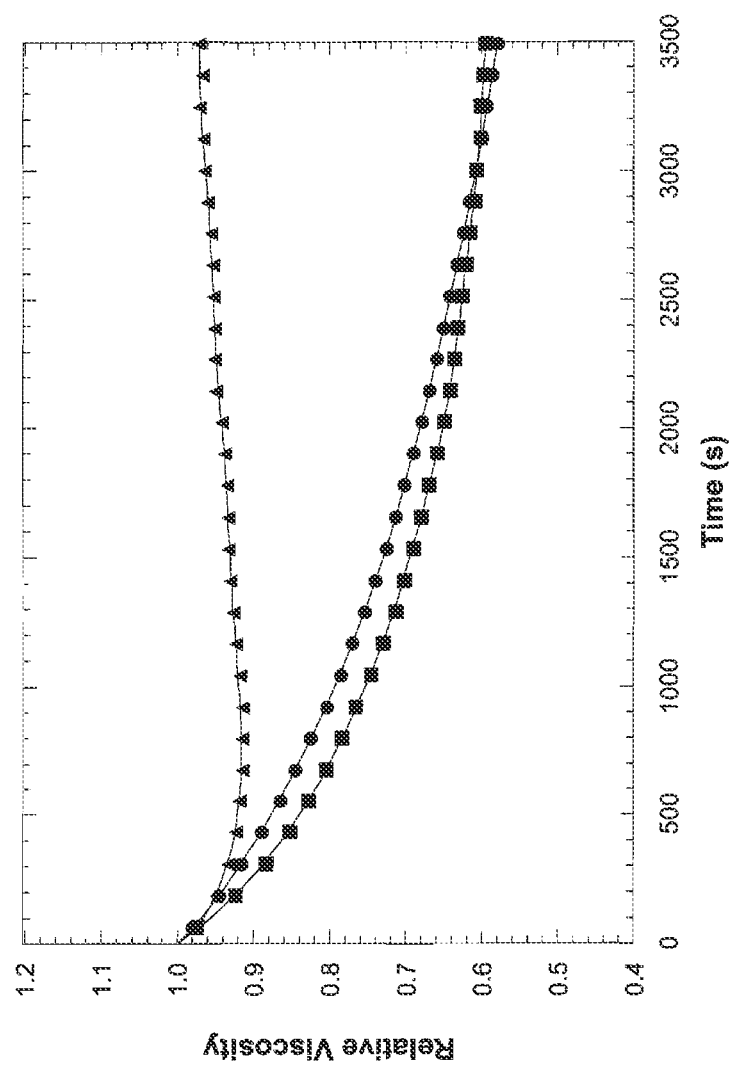
FIG. 1 is a graphical representation showing relative viscosity with time when heated under nitrogen for samples of commercially available PPS (shown as circles), modified PPS obtained similarly to the method of Example 1 (shown as triangles), and comparative PPS obtained similarly to the method of Comparative Example A (shown as squares).

The methods described herein are described with reference to the following terms.

Where the indefinite article "a" or "an" is used with respect to a statement or description of the presence of a step in a process of this invention, it is to be understood, unless the statement or description explicitly provides to the contrary, that the use of such indefinite article does not limit the presence of the step in the process to one in number.

Where a range of numerical values is recited herein, unless otherwise stated, the range is intended to include the endpoints thereof, and all integers and fractions within the range. It is not intended that the scope of the invention be limited to the specific values recited when defining a range.

The following definitions are used herein and should be referred to for interpretation of the claims and the specification.

The term "PAS" means polyarylene sulfide.

The term "PPS" means polyphenylene sulfide.

The term "secondary carbon atom" means a carbon atom that is bonded to two other carbon atoms with single bonds.

The term "tertiary carbon atom" means a carbon atom that is bonded to three other carbon atoms with single bonds.

The term "thermal stability", as used herein, refers to the degree of change in the weight average molecular weight of a PAS polymer induced by elevated temperatures in the absence of oxygen. As the thermal stability of a given PAS polymer improves, the degree to which the polymer's weight average molecular weight changes over time decreases. Generally, in the absence of oxygen, changes in molecular weight are often considered to be largely due to chain scission, which typically decreases the molecular weight of a PAS polymer.

The term "thermo-oxidative stability", as used herein, refers to the degree of change in the weight average molecular weight of a PAS polymer induced by elevated temperatures in the presence of oxygen. As the thermo-oxidative stability of a given PAS polymer improves, the degree to which the polymer's weight average molecular weight changes over time decreases. Generally, in the presence of oxygen, changes in molecular weight may be due to a combination of oxidation of the polymer and chain scission. As oxidation of the polymer typically results in cross-linking, which increases molecular weight, and chain scission typically decreases the molecular weight, changes in molecular weight of a polymer at elevated temperatures in the presence of oxygen may be challenging to interpret.

The term "° C." means degrees Celsius.
The term "kg" means kilogram(s).
The term "g" means gram(s).
The term "mg" means milligram(s).
The term "mol" means mole(s).
The term "min" means minute(s).
The term "rpm" means revolutions per minute.
The term "rad" means radians.
The term "psi" means pounds per square inch.
The term "mL" means milliliter(s).

The term "weight percent" as used herein refers to the weight of a constituent of a composition relative to the entire weight of the composition unless otherwise indicated. Weight percent is abbreviated as "wt %".

In the methods described herein, a polyarylene sulfide is contacted, in the presence of a suitable solvent, with at least one reducing agent and at least one base to form a first mixture. Optionally, the polyarylene sulfide is additionally contacted in this step with a compound comprising zinc(II), tin(II), tin(IV), bismuth(V), antimony(III), antimony(V), or a combination thereof. The first mixture is heated to form a second mixture in which the polyarylene sulfide is dissolved. The dissolved polyarylene sulfide is then precipitated from the second mixture to obtain a modified polyarylene sulfide. The modified polyarylene sulfide has improved thermo-oxidative and thermal stability relative to the thermo-oxidative and thermal stability of the polyarylene sulfide before modification, measured under the same conditions. Optionally, the modified polyarylene sulfide may be washed and/or dried.

In one embodiment, the polyarylene sulfide is polyphenylene sulfide, and modified polyphenylene sulfide is obtained by a method comprising the steps of:

a) contacting, in the presence of a suitable solvent, a polyphenylene sulfide with at least one reducing agent and at least one base to form a first mixture, wherein the reducing agent comprises zinc(0), tin(0), tin(II), bismuth (0), bismuth (III), or a combination thereof, and the ratio of the reducing agent to the polyphenylene sulfide is from about 0.0001:1 to about 0.5:1 on a weight basis;

b) heating the first mixture to a sufficient temperature and for a sufficient time to form a second mixture wherein the polyphenylene sulfide is dissolved in the solvent; and c) precipitating the dissolved polyphenylene sulfide from the second mixture to obtain a modified polyphenylene sulfide having improved thermo-oxidative stability relative to the thermo-oxidative stability of the polyphenylene sulfide of step a) measured under the same conditions.

Polyarylene sulfides (PAS) include linear, branched or cross linked polymers that include arylene sulfide units. Polyarylene sulfide polymers and their synthesis are known in the art and such polymers are commercially available. Polyarylene sulfide polymers may be obtained from the reaction of a polyhaloaromatic compound with an alkali metal sulfide, for example.

Exemplary polyarylene sulfides useful in the invention include polyarylene thioethers containing repeat units of the formula $—[(Ar^1)_n—X]_m—[(Ar^2)_i—Y]_j—(Ar^3)_k—Z]_l—[(Ar^4)_o—W]_p—$ wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from $—SO—$, $—S—$, $—SO—$, $—CO—$, $—O—$, $—COO—$ or alkylene or alkylidene groups of 1 to 6 carbon atoms and wherein at least one of the linking groups is $—S—$; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes at least 30 mol %, particularly at least 50 mol % and more particularly at least 70 mol % arylene sulfide ($—S—$) units. Preferably the polyarylene sulfide polymer includes at least 85 mol % sulfide linkages attached directly to two aromatic rings. Advantageously the polyarylene sulfide polymer is polyphenylene sulfide (PPS), defined herein as containing the phenylene sulfide structure $—(C_6H_4—S)_n—$ (wherein n is an integer of 1 or more) as a component thereof.

A polyarylene sulfide polymer having one type of arylene group as a main component can be preferably used. However, in view of processability and heat resistance, a copolymer containing two or more types of arylene groups can also be used. A PPS resin comprising, as a main constituent, a p-phenylene sulfide recurring unit is particularly preferred since it has excellent processability and is industrially easily obtained. In addition, a polyarylene ketone sulfide, polyarylene ketone ketone sulfide, polyarylene sulfide sulfone, and the like can also be used.

Specific examples of possible copolymers include a random or block copolymer having a p-phenylene sulfide recurring unit and an m-phenylene sulfide recurring unit, a random or block copolymer having a phenylene sulfide recurring unit and an arylene ketone sulfide recurring unit, a random or block copolymer having a phenylene sulfide recurring unit and an arylene ketone ketone sulfide recurring unit, and a random or block copolymer having a phenylene sulfide recurring unit and an arylene sulfone sulfide recurring unit.

The polyarylene sulfides may optionally include other components not adversely affecting the desired properties thereof. Exemplary materials that could be used as additional components would include, without limitation, antimicrobials, pigments, antioxidants, surfactants, waxes, flow promoters, particulates, stabilizers, and other materials added to enhance processability of the polymer. These and other additives can be used in conventional amounts.

As noted above, PPS is an example of a polyarylene sulfide. PPS is an engineering thermoplastic polymer that is widely used for film, fiber, injection molding, and composite applications due to its high chemical resistance, excellent mechanical properties, and good thermal properties. However, the thermal and oxidative stability of PPS is considerably reduced in the presence of air and at elevated temperature conditions. Under these conditions, severe degradation can occur, leading to the embrittlement of PPS material and severe loss of strength. Improved thermal and oxidative stability of PPS at elevated temperatures and in the presence of air are desired.

The polyarylene sulfide may be used directly as obtained from the source or synthetic procedure, or it may be mechanically processed to reduce the size of the polyarylene sulfide solids and/or to increase the exposed surface area. Useful means of mechanical processing includes, but is not limited to, milling, crushing, grinding, shredding, chopping, and ultrasound. This mechanical processing may occur before or during contact with a reducing agent and a base.

The polyarylene sulfide is contacted, in the presence of a suitable solvent, with at least one reducing agent and at least one base to form a first mixture comprising the polyarylene sulfide, the reducing agent, and the base. The reducing agent comprises zinc(0), tin(0), tin(II), bismuth(0), bismuth(III), or a combination thereof. Zinc, tin, and bismuth metals may be used as powders or granules. In one embodiment, the reducing agent comprises zinc(0). In one embodiment, the reducing agent comprises tin(II). Examples of suitable tin(II) compounds include tin(II) carboxylates, oxides, and sulfates, for example $SnCl_2$, SnO, tin(II) ethyl hexanoate, and $SnSO_4$. In one embodiment, the tin(II) compound can be a branched tin(II) carboxylate selected from the group consisting of $Sn(O_2CR)_2$, $Sn(O_2CR)(O_2CR')$, $Sn(O_2CR)(O_2CR'')$, and mixtures thereof, as described herein below. In one embodiment, the reducing agent comprises bismuth (0), bismuth (III), or a combination thereof. Examples of suitable bismuth (III) compounds include bismuth(III) carboxylates, carbonates, oxides, and nitrates, for example bismuth(III) 2-ethylhexanoate, bismuth(III) neodecanoate, and bismuth (III) oxide. Typically, the ratio of the reducing agent to the polyarylene sulfide is from about 0.0001:1 to about 0.5:1, for example from about 0.01:1 to about 0.5:1, or for example from about 0.1:1 to about 0.5:1, on a weight basis. Suitable reducing agents may be obtained commercially.

If the polyarylene sulfide is heated in the presence of oxygen, a sufficient amount of reducing agent should be used such that no significant discoloration of the polyarylene sulfide occurs, and/or no significant increase in molecular weight is observed while heating the polyarylene sulfide in air.

The base comprises a metal salt. In one embodiment, the base comprises zinc(II), tin(II), bismuth(III), $Li^+$, $Na^+$, $K^+$, $Rb^+$, $Cs^+$, or a mixture thereof. In one embodiment, the base comprises bicarbonate, carbonate, hydroxide, oxide, sulfide, a carboxylate, or a mixture thereof. The carboxylate can be linear or branched and can contain from 2 to 18 carbons. Suitable carboxylates include, for example, benzoate, acetate, 2-ethylhexanoate, octanoate, stearate, propionate, and butyrate. Examples of suitable bases include sodium bicarbonate, sodium carbonate, sodium acetate, sodium hydroxide, sodium benzoate, potassium bicarbonate, potassium carbonate, potassium acetate, potassium hydroxide, potassium benzoate, lithium bicarbonate, lithium carbonate, lithium acetate, lithium hydroxide, lithium benzoate, zinc oxide, zinc sulfide, tin(II) ethylhexanoate, zinc(II) stearate, bismuth(III) 2-ethylhexanoate, and mixtures thereof. In one embodiment, the base comprises sodium bicarbonate. In one embodiment, the base comprises zinc oxide. Typically, the ratio of the base to the polyarylene sulfide is from about 0.001:1 to about 0.5:1, for example from about 0.01:1 to about 0.5:1, or for example from about 0.01:1 to about 0.05:1, on a weight basis.

In some cases, the reducing agent may be sufficiently basic that it can function as both a reducing agent and a base. Examples of such a reducing agent include tin(II) ethyl hexanoate and bismuth(III) 2-ethylhexanoate.

The reducing agent and the base may be combined together before contacting the polyarylene sulfide, or the reducing agent and the base may be added sequentially to the polyarylene sulfide, in any order. The reducing agent and the base may each be used as a solid, or as a slurry in a suitable solvent as described herein below. In some cases, sufficient base may be generated from oxidation of the reducing agent that additional base need not be added. An example of such a reducing agent is zinc metal, from which the base zinc oxide can be generated under appropriate conditions, for example exposure to air.

The contacting to form a first mixture is performed in the presence of a suitable solvent, for example a solvent in which the polyarylene sulfide can be completely dissolved. Examples of suitable solvents are solvents which comprise formamide, acetamide, N-methylformamide, N,N'-dimethylformamide, N,N'-dimethylacetate, N-ethylpropionamide, N,N'-dipropylbutyramide, 2-pyrrolidone, N-methyl-2-pyrrolidone (NMP), ε-caprolactam, N-methyl-ε-caprolactam, N,N'-ethylenedi-2-pyrrolidone, hexamethylphosphoramide, tetramethylurea, 1-cyclohexyl-2-pyrrolidinone, or mixtures thereof. In one embodiment, the solvent comprises N-methyl-2-pyrrolidone, 1-cyclohexyl-2-pyrrolidinone, or mixtures thereof. The amount of solvent used is typically in excess of that sufficient to dissolve the polyarylene sulfide at the temperature of the subsequent heating step. Generally, the amount of solvent used, by weight, is at least four times that of the polyarylene sulfide used.

The contacting to form a first mixture is typically performed under an inert atmosphere, for example under nitrogen or argon, to minimize the amount of oxygen present and to avoid degradation of the polyarylene sulfide during the contacting step. However, the contacting may be performed in air if a sufficient amount of reducing agent is used, such that no significant discoloration of the polyarylene sulfide occurs, and/or no significant increase in molecular weight is observed, while heating the polyarylene sulfide in air.

In one embodiment of the method, the reducing agent comprises zinc(0), the base comprises sodium bicarbonate, and the solvent comprises N-methyl-2-pyrrolidone. In one embodiment, the polyarylene sulfide is polyphenylene sulfide. In one embodiment, the contacting is performed in the absence of oxygen. By "absence of oxygen" is meant that the atmosphere under which the contacting is performed contains less than 1% of air by volume.

Optionally, in the step of contacting the polyarylene sulfide with at least one reducing agent and at least one base, the polyarylene sulfide is additionally contacted with at least one compound comprising zinc(II), tin(II), tin(IV), bismuth(V), antimony(III), antimony(V), or a combination thereof. Compounds comprising other metals having an affinity for binding with sulfur(II) may also be used. Suitable compounds include metal halides, metal oxides, metal carbonates, metal carboxylates, and metal sulfates. Examples include $SnCl_2$, SnO, tin (II) ethyl hexanoate, $SnSO_4$, zinc(II) stearate, and zinc(II) 2-ethylhexanoate. In one embodiment, the additional compound comprises zinc(II), tin(II), or a combination thereof. In one embodiment, the additional compound comprises a tin (II) compound, which may be the same or different from any tin(II) compound used as a reducing agent. In one embodiment, the polyarylene sulfide comprises polyphenylene sulfide, and the polyphenylene sulfide is additionally contacted with at least one compound comprising zinc(II), tin(II), tin (IV), bismuth(V), antimony(III), antimony(V), or a combination thereof, wherein the ratio of the compound to the polyphenylene sulfide is from about 0.0001:1 to about 0.5:1 on a weight basis.

In one embodiment, the zinc(II) compound comprises a zinc(II) carboxylate selected from the group consisting of $Zn(O_2CR^a)_2$, or $Zn(O_2CR^a)(O_2CR^b)$, or mixtures thereof, where the radicals $R^a$ and $R^b$ are independently hydrocarbon moieties or substituted hydrocarbon moieties. The carboxylate moieties $O_2CR^a$ and $O_2CR^b$ may independently represent either linear or branched alkyl carboxylate anions with the proviso that if $R^a$ and $R^b$ are both linear, then either one of them or both of them independently contains nine or less carbon atoms. In one embodiment, the branched zinc(II) carboxylate comprises zinc di-(2-ethyl hexanoate), where $R^a = R^b = -CH_2(C_2H_5)(CH_2)_3CH_3$.

In one embodiment, the tin(II) compound comprises at least one tin additive comprising a branched tin(II) carboxylate selected from the group consisting of $Sn(O_2CR)_2$, $Sn(O_2CR)(O_2CR')$, $Sn(O_2CR)(O_2CR'')$, and mixtures thereof, where the carboxylate moieties $O_2CR$ and $O_2CR'$ independently represent branched carboxylate anions and the carboxylate moiety $O_2CR''$ represents a linear carboxylate anion, as disclosed in published application WO 2011/119543. In one embodiment, the branched tin(II) carboxylate comprises $Sn(O_2CR)_2$, $Sn(O_2CR)(O_2CR')$, or a mixture thereof. In one embodiment, the branched tin(II) carboxylate comprises $Sn(O_2CR)_2$. In one embodiment, the branched tin(II) carboxylate comprises $Sn(O_2CR)(O_2CR')$. In one embodiment, the branched tin(II) carboxylate comprises $Sn(O_2CR)(O_2CR'')$.

Optionally, the tin additive may further comprise a linear tin(II) carboxylate $Sn(O_2CR'')_2$. Generally, the relative amounts of the branched and linear tin(II) carboxylates are selected such that the sum of the branched carboxylate moieties $[O_2CR+O_2CR']$ is at least about 25% on a molar basis of the total carboxylate moieties $[O_2CR+O_2CR'+O_2CR'']$ contained in the additive. For example, the sum of the branched carboxylate moieties may be at least about 33%, or at least about 40%, or at least about 50%, or at least about 66%, or at least about 75%, or at least about 90%, of the total carboxylate moieties contained in the tin additive.

In one embodiment, the radicals R and R' both comprise from 6 to 30 carbon atoms and both contain at least one secondary or tertiary carbon. The secondary or tertiary carbon(s) may be located at any position(s) in the carboxylate moieties $O_2CR$ and $O_2CR'$, for example in the position α to the carboxylate carbon, in the position ω to the carboxylate carbon, and at any intermediate position(s). The radicals R and R' may be unsubstituted or may be optionally substituted with inert groups, for example with fluoride, chloride, bromide, iodide, nitro, hydroxyl, and carboxylate groups. Examples of suitable organic R and R' groups include aliphatic, aromatic, cycloaliphatic, oxygen-containing heterocyclic, nitrogen-containing heterocyclic, and sulfur-containing heterocyclic radicals. The heterocyclic radicals may contain carbon and oxygen, nitrogen, or sulfur in the ring structure.

In one embodiment, the radical R'' is a primary alkyl group comprising from 6 to 30 carbon atoms, optionally substituted with inert groups, for example with fluoride, chloride, bromide, iodide, nitro, hydroxyl, and carboxylate groups. In one embodiment, the radical R'' is a primary alkyl group comprising from 6 to 20 carbon atoms.

In one embodiment, the radicals R or R' independently or both have a structure represented by Formula (I),

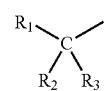

Formula (I)

wherein $R_1$, $R_2$, and $R_3$ are independently:
H;
a primary, secondary, or tertiary alkyl group having from 6 to 18 carbon atoms, optionally substituted with fluoride, chloride, bromide, iodide, nitro, hydroxyl, and carboxyl groups;
an aromatic group having from 6 to 18 carbon atoms, optionally substituted with alkyl, fluoride, chloride, bromide, iodide, nitro, hydroxyl, and carboxyl groups; and
a cycloaliphatic group having from 6 to 18 carbon atoms, optionally substituted with fluoride, chloride, bromide, iodide, nitro, hydroxyl, and carboxyl groups;
with the proviso that when $R_2$ and $R_3$ are H, $R_1$ is:
a secondary or tertiary alkyl group having from 6 to 18 carbon atoms, optionally substituted with fluoride, chloride, bromide, iodide, nitro, hydroxyl, and carboxyl groups;
an aromatic group having from 6 to 18 carbons atoms and substituted with a secondary or tertiary alkyl group having from 6 to 18 carbon atoms, the aromatic group and/or the secondary or tertiary alkyl group being optionally substituted with fluoride, chloride, bromide, iodide, nitro, hydroxyl, and carboxyl groups; and
a cycloaliphatic group having from 6 to 18 carbon atoms, optionally substituted with fluoride, chloride, bromide, iodide, nitro, hydroxyl, and carboxyl groups.

In one embodiment, the radicals R or R' or both have a structure represented by Formula (I), and $R_3$ is H.

In another embodiment, the radicals R or R' or both have a structure represented by Formula (II),

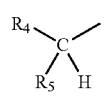

Formula (II)

wherein
$R_4$ is a primary, secondary, or tertiary alkyl group having from 4 to 6 carbon atoms, optionally substituted with fluoride, chloride, bromide, iodide, nitro, and hydroxyl groups; and
$R_5$ is a methyl, ethyl, n-propyl, sec-propyl, n-butyl, sec-butyl, or tert-butyl group, optionally substituted with fluoride, chloride, bromide, iodide, nitro, and hydroxyl groups.

In one embodiment, the radicals R and R' are the same and both have a structure represented by Formula (II), where $R_4$ is n-butyl and $R_5$ is ethyl. This embodiment describes the branched tin(II) carboxylate tin(II) 2-ethylhexanoate, also referred to herein as tin(II) ethylhexanoate.

The tin(II) carboxylate(s) may be obtained commercially, or may be generated in situ from an appropriate source of tin(II) cations and the carboxylic acid corresponding to the desired carboxylate(s). The tin(II) additive may be present in the polyarylene sulfide at a concentration sufficient to provide improved thermo-oxidative and/or thermal stability. In one embodiment, the tin(II) additive may be present at a concentration of about 10 weight percent or less, based on the weight of the polyarylene sulfide. For example, the tin(II) additive may be present at a concentration of about 0.01 weight percent to about 5 weight percent, or for example from about 0.25 weight percent to about 2 weight percent. Typically, the concentration of the tin(II) additive may be higher in a master batch composition, for example from about 5 weight percent to about 10 weight percent, or higher. The tin(II) additive may be contacted with the dissolved or solid polyarylene sulfide as a solid, as a slurry, or as a solution.

U.S. Pat. Nos. 3,405,073 and 3,489,702 relate to compositions useful in the enhancement of the resistance of ethylene sulfide polymers to heat deterioration. Such polymers are composed of ethylene sulfide units linked in a long chain $(CH_2CH_2-S)_n$, where n represents the number of such units in the chain, and are thus of the nature of polymeric ethylene thioethers. The references note that the utility of these polymers as plastic materials for industrial applications is seriously limited, however, due to their lack of adequate mechanical strength. The references disclose that an organotin compound having organic radicals attached to tin through oxygen, such as a tin carboxylate, phenolate or alcoholate, is employed to enhance resistance to heat deterioration of ethylene sulfide polymers. The references note that the efficacy of the organotin compounds is frequently enhanced by a compound of another polyvalent metal, or another tin compound. The second polyvalent metal can be any metal selected from Groups II to VIII of the Periodic Table. There is a difference in the chemical reactivity and physical properties of ethylene sulfide polymers as compared to polyarylene sulfides. Applicants have discovered, however, that various tin(II) additives as described herein have the same effect in polyarylene sulfides as they do in ethylene sulfide polymers.

The choice of which, if any, optional compound comprising a metal having an affinity for binding with sulfur(II) to include in the contacting step can depend on economic considerations. A sufficient amount of the compound should be used such that the modified polyarylene sulfide exhibits no significant increase in molecular weight when heated in air. Typically, the ratio of the compound to the polyarylene sulfide is from about 0.0001:1 to about 0.5:1, for example from about 0.01:1 to about 0.5:1, or for example from about 0.01:1 to about 0.05:1, on a weight basis. The contacting of the polyarylene sulfide with at least one compound comprising zinc(II), tin(II), tin(IV), bismuth(V), antimony(III), antimony (V), or a combination thereof may occur concurrently with the contacting of the polyarylene sulfide with the reducing agent and the base, or as a separate step after the contacting with the reducing agent and base but before the first mixture is heated to dissolve the polyarylene sulfide.

The contacting of the polyarylene sulfide with at least one reducing agent and at least one base, and optionally additionally with at least one compound comprising zinc(II), tin(II), tin(IV), bismuth(V), antimony(III), antimony(V), or a combination thereof, may be performed in any suitable vessel, such as a batch reactor or a continuous reactor. The suitable vessel may be equipped with a means, such as impellers, for agitating the contents. Reactor design is discussed in Lin, K.-H., and Van Ness, H. C. (in Perry, R. H. and Chilton, C. H. (eds), Chemical *Engineer's Handbook*, 5$^{th}$ Edition (1973) Chapter 4, McGraw-Hill, NY). The contacting step may be carried out as a batch process, or as a continuous process. In one embodiment, contacting the polyarylene sulfide with a reducing agent and a base may be performed in the same vessel as the contacting with a compound comprising a metal having an affinity for binding with sulfur(II). In one embodiment, the contacting step may be performed in the same vessel as the heating step.

The first mixture is heated to a sufficient temperature and for a sufficient time to form a second mixture wherein the polyarylene sulfide is dissolved in the solvent. Dissolution of the polyarylene sulfide enables its modification by the reducing agent and the base. The second mixture comprises solvent, reducing agent, and base in addition to the dissolved polyarylene sulfide. In cases where the polyarylene sulfide is additionally contacted with at least one compound comprising zinc(II), tin(II), tin(IV), bismuth(V), antimony(III), antimony(V), or a combination thereof, the second mixture further comprises that compound, or a compound generated from it during the heating step. Typically, the first mixture is heated to above about 220° C., for example in the range of about 220° C. to about 280° C., and for a period of time ranging from about 30 seconds to about 3 hours, for example from about 1 minute to about 30 minutes, to dissolve the polyarylene sulfide. Longer heating times can also be used. The first mixture may be heated, for example, by microwave energy or by thermal means. Typically, the heating is performed under an inert atmosphere, for example under nitrogen or argon, to minimize the amount of oxygen present and to avoid degradation of the polyarylene sulfide during the heating step. However, if a sufficient amount of reducing agent is used, the heating may be performed under air. In one embodiment, the heating is performed in the absence of oxygen.

For the step of heating the first mixture to dissolve the polyarylene sulfide, the temperature, time, polyarylene sulfide, the reducing agent and its amount, the base and its amount, and the polyarylene sulfide particle size are related; thus, these variables may be adjusted as necessary to obtain a sufficient dissolution rate of the polyarylene sulfide.

The dissolved polyarylene sulfide is then precipitated from the second mixture to obtain a modified polyarylene sulfide. The precipitation may be performed by any means known in the art, for example by cooling the second mixture to a temperature at which the polyarylene sulfide is less soluble in the solvent, or by addition of solvents in which the polyarylene sulfide is less soluble. The precipitated modified polyarylene sulfide can be isolated by any means known in the art, for example by filtering. Optionally, the modified polyarylene sulfide can be washed with one or more wash solvents such as NMP, water, and/or acetone to remove any soluble materials present on the precipitated modified polyarylene sulfide. At least a portion of the washing can be performed at an elevated temperature, for example up to about 250° C. The modified polyarylene sulfide may be dried, for example under vacuum or under a stream of inert gas, to remove remaining traces of solvents.

In one embodiment, the method further comprises a step of end-capping the modified polyarylene sulfide with a halogenated aromatic compound. The halogenated aromatic compound comprises at least one chlorinated, brominated, and/or iodinated phenyl, biphenyl, naphthylene, anthracene, phenanthrene, phenylsulfane, or oxydibenzene radical which may optionally be substituted with hydroxy, phenyl thio, phenoxy, or other groups. Examples of suitable halogenated aromatic compounds include (4-chlorophenyl)(phenyl)sulfane, 1-chloro-4-phenoxybenzene, and 4-chlorophenol. The halogenated aromatic compound is contacted with the polyarylene sulfide, for example in the presence of the reducing agent and base, to form the first mixture as described herein above. Alternatively, the halogenated aromatic compound can be added to the first mixture after it is formed but before the heating step. In one embodiment, the polyarylene sulfide can be contacted with the halogenated aromatic compound at a temperature in the range of about 220° C. to about 280° C. prior to contacting the end-capped polyarylene sulfide with the reducing agent and base to form the first mixture. Typically, the ratio of the halogenated aromatic compound to the polyarylene sulfide is from about 0.001:1 to about 0.5:1, for example from about 0.01:1 to about 0.5:1, or for example from about 0.01:1 to about 0.05:1, on a weight basis. End-capping may be performed in order to permanently block mercaptan ends in the polyarylene sulfide from subsequent reactions.

The modified polyarylene sulfide may be compounded with a additive to provide additional thermal and/or thermooxidative stability. For example, U.S. Pat. No. 4,411,853 discloses that the heat stability of arylene sulfide resins is improved by the addition of an effective stabilizing amount of at least one organotin compound which retards curing and cross-linking of the resin during heating. A number of dialkyltin dicarboxylate compounds used as cure retarders and heat stabilizers are disclosed, as well as di-n-butyltin-S,S'-bis (isooctyl thioacetate) and di-n-butyltin-S,S'-bis(isooctyl-3-thiopropionate. U.S. Pat. No. 4,418,029 discloses that the heat stability of arylene sulfide resins is improved by the addition of cure retarders comprising Group IIA or Group IIB metal salts of fatty acids represented by the structure $[CH_3(CH_2)_nCOO-]_2M$, where M is a Group IIA or Group IIB metal and n is an integer from 8 to 18. The effectiveness of zinc stearate, magnesium stearate, and calcium stearate is disclosed. U.S. Pat. No. 4,426,479 relates to a chemically stabilized poly-p-phenylene sulfide resin composition and a film made thereof. The reference discloses that the PPS resin composition should contain at least one metal component selected from the group consisting of zinc, lead, magnesium, manganese, barium, and tin, in a total amount of from 0.05 to 40 wt %. These metal components may be contained in any form.

In one embodiment, the method further comprises a step of compounding the modified polyarylene sulfide with an additive comprising zinc(II), tin(II), or a combination thereof. Such compounding can be typically performed to impart desired characteristics to the polyarylene sulfide, such as increased thermo-oxidative and/or thermal stability beyond that provided by modifying the polyarylene sulfide by the methods described herein. In one embodiment, the additive comprises a zinc(II) compound comprising a zinc(II) carboxylate selected from the group consisting of $Zn(O_2CR^a)_2$, or $Zn(O_2CR^aX)(O_2CR^b)$, or mixtures thereof, as disclosed herein above. In one embodiment, the modified polyarylene sulfide may be compounded with an additive comprising at least one tin additive comprising a branched tin(II) carboxylate selected from the group consisting of $Sn(O_2CR)_2$, $Sn(O_2CR)(O_2CR')$, $Sn(O_2CR)(O_2CR'')$, and mixtures thereof, where the carboxylate moieties $O_2CR$ and $O_2CR'$ independently represent branched carboxylate anions and the carboxylate moiety $O_2CR''$ represents a linear carboxylate anion, as described herein above.

The tin(II) additive may be present in the modified polyarylene sulfide at a concentration sufficient to provide improved thermo-oxidative and/or thermal stability. In one embodiment, the tin(II) additive may be present at a concentration of about 50 weight percent or less, based on the weight of the polyarylene sulfide. For example, the tin(II) additive may be present at a concentration of about 0.01 weight percent to about 5 weight percent, or for example from about 0.25 weight percent to about 2 weight percent. Typically, the concentration of the tin(II) additive may be higher in a master batch composition, for example from about 5 weight percent to about 10 weight percent, or higher.

In the modified polyarylene sulfide obtained by the present method, the reducing agent may be present at a concentration of about 10 weight percent or less, based on the weight of the polyarylene sulfide. For example, in the case where zinc metal is used as the reducing agent with polyphenylene sulfide, the modified polyphenylene sulfide contains from about 0.05 to about 10 weight percent zinc, for example from about 0.1 to about 5 weight percent zinc, or from about 0.1 to about 2 weight percent zinc, based on the weight of the polyphenylene sulfide. The modified polyarylene sulfide exhibits improved thermal stability relative to the thermal stability of the polyarylene sulfide before solution processing (the polyarylene sulfide used in step a) of the present method) when measured under the same conditions. The modified polyarylene sulfide also exhibits improved thermo-oxidative stability relative to that of the polyarylene sulfide before solution processing, when measured under the same conditions. The improved thermal and thermo-oxidative stability can be observed by DSC analysis, for example by an increased retention of melting point (that is, a smaller change in the melting point) after exposure to air at elevated temperatures.

The modified polyarylene sulfides obtained by the present solution phase processing method have a reduced volatile content when compared to the corresponding polyarylene sulfides before modification. The volatile content may be reduced by at least 10, 20, 30, 40, 50, 60, 70, 80, or 90% on a weight basis, depending on the initial volatile content of the polyarylene sulfide before modification. The term "volatile content" refers to the total volatile impurities contained in the polyarylene sulfide, including the solvent used in the solution phase processing as well as any other volatile impurities. For polyphenylene sulfide, the volatile content includes such possible components as phenol, thiophenol, chlorothiophenols, mercaptodiphenylsulfides, and chlorinated mercaptodiphenylsulfides. The volatiles content of modified and unmodified polyarylene sulfides and polyphenylene sulfides can be determined by the Volatiles Test described herein below. In one embodiment, modified polyphenylene sulfide obtained as described herein contains 200 ppm or less, for example 150 ppm or less, or 100 ppm or less, or 50 ppm or less, of phenol+ thiophenol+p-chlorothiophenol as determined using the Volatiles Test. In one embodiment, modified polyphenylene sulfide obtained as described herein has a volatile content which is at least 10% reduced in comparison to the volatile content of the polyphenylene sulfide before modification. A reduced volatiles content of polyarylene sulfides is desired for improved polymer processing.

The modified polyarylene sulfides are useful in various applications which require superior thermal resistance, chemical resistance, and electrical insulating properties. Articles comprising a modified polyarylene or polyphenylene sulfide as described herein above include a fiber, a felt comprising a nonwoven web of fibers, a bag filter, a nonwoven fabric, a film, a coating, and a molded part. A bag filter typically has a tubular section, one closed end, and one open end, and a felt comprising a nonwoven web of fibers forms at least the tubular section of the filter bag. Such a fiber, felt, nonwoven fabric, or bag filter may be useful, for example, in filtration media employed at elevated temperatures, as in filtration of exhaust gas from incinerators or coal fired boilers with bag filters. Coatings comprising the novel polyarylene or polyphenylene sulfide compositions may be used on wires or cables, particularly those in high temperature, oxygen-containing environments.

EXAMPLES

The present invention is further defined in the following examples. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

Materials

The following materials were used in the examples. All commercial materials were used as received unless otherwise indicated. Fortron® 309 polyphenylene sulfide was obtained from Ticona (Florence, Ky.). Sodium bicarbonate (99.7%) was obtained from EMD Chemicals (Philadelphia, Pa.). Zinc metal (>98%) was obtained from Aldrich. NMP (99%) was obtained from Sigma Aldrich. Acetone (99.5%) was obtained from EMD Chemicals. Zinc stearate (99%) was obtained from The Struktol Company (Stow, Ohio). Tin(II) ethylhexanoate (85%, "Fascat 2003") was obtained from Arkema Inc. (Philadelphia, Pa.). Bismuth(III) octoate, also referred to as bismuth(III) 2-ethylhexanoate, (85%) was obtained from The Shepherd Chemical Company (Norwood, Ohio).

Analytical Methods

Complex viscosity was measured at 300° C. under nitrogen or air in accordance with ASTM D 4440 using a Malvem controlled-stress rotational rheometer equipped with an extended temperature cell (ETC) and 25 mm parallel plates with smooth surfaces. Plate temperature was calibrated using a disc made of nylon with a thermocouple embedded in the middle. Disks with a diameter of 25 mm and a thickness of 1.2 mm were prepared from pellets of the compositions of the Examples and the Comparative Examples by compression molding under vacuum at a temperature of 290° C. using a Dake Model 944605 laboratory press.

To perform complex viscosity measurements, a molded disk of the PPS composition was inserted between the parallel plates preheated to 300° C., the door of the forced convection oven was closed, the gap was changed to around 3200 μm to prevent curling of the disk, and the oven temperature was allowed to re-equilibrate to 300° C. The gap was then changed from 3200 to 1050 μm, the oven was opened, the edges of the sample were carefully trimmed, the oven was closed, the oven temperature was allowed to re-equilibrate to 300° C., the gap was adjusted to 1000 μm, and the measurement started. A time sweep was performed at a frequency of 6.283 rad/s using a strain of 10%.

In the 250° C. air aging method, the thermo-oxidative stability of PPS samples was assessed by measuring changes in melting point as a function of exposure time in air at 250° C. Samples (at least 20 g) of the PPS of the Example and the Comparative Examples were weighed separately into 2 inch circular aluminum pans and placed into a 250° C. preheated mechanical convection oven with active circulation. After 10 days, the samples were removed from the oven. Each aged sample was analyzed by differential scanning calorimetry (DSC) performed using a TA Instruments Q100 equipped with a TA Instruments Refrigerated Cooling System. For DSC analysis, samples were prepared by accurately weighing 2-25 mg of the aged PPS sample into a standard aluminum DSC pan. The temperature program was designed to erase the thermal history of the sample by first heating it above its melting point from 35° C. to 320° C. at 20 K/min and then allowing the sample to re-crystallize during cooling from 320° C. to 35° C. at 10 K/min. Reheating the sample from 35° C. to 320° C. at 10 K/min afforded the melting point of the sample, which was recorded and compared directly to melting point of corresponding examples, comparative examples and control PPS compositions. The entire temperature program was carried out under nitrogen purge at a flow rate of 50 mL/min. All melting points were quantified using TA's Universal Analysis Software via the software linear peak integration function.

In the 320° C. air aging method, the thermo-oxidative stability of PPS samples was assessed by measuring changes in melting point as a function of exposure time in air at 320° C. Samples (8-12 mg) of the compositions of the Example and the Comparative Examples were placed inside a standard aluminum DSC pan without a lid. DSC was performed using a TA instruments Q100 equipped with a mechanical cooler. The temperature program was designed to melt the polymer under nitrogen, expose the sample to air at 320° C. for 20 min, crystallize the air-exposed sample under nitrogen, and then reheat the sample to identify changes in the melting point. Thus, each sample was heated from 35° C. to 320° C. at 20° C./min under nitrogen (flow rate: 50 mL/min) and held isothermally at 320° C. for 5 min, at which point the purge gas was switched from nitrogen to air (flow 50 mL/min) while maintaining a temperature of 320° C. for 180 minutes. Subsequently, the purge gas was switched back from air to nitrogen (flow rate: 50 mL/min) and the sample was cooled from 320° C. to 35° C. at 10° C./min and then reheated from 35° C. to 320° C. at 10° C./min to measure the melting point of the air-exposed material. All melt curves were bimodal. The melting point of the lower melt was quantified using TA's Universal Analysis software via the software's inflection of the onset function.

The melting point of Fortron® 309 PPS before aging tests was measured using the following procedure. DSC was performed using a TA Instruments Q100 equipped with a TA Instruments Refrigerated Cooling System. Samples were prepared by accurately weighing 2-25 mg of Fortron® 309 into a standard aluminum DSC pan. The temperature program was designed to erase the thermal history of the sample by first heating it above its melting point from 35° C. to 320° C. at 20° C./min and then allowing the sample to re-crystallize during cooling from 320° C. to 35° C. at 10° C./min. Reheating the sample from 35° C. to 320° C. at 10° C./min afforded the melting point of the sample. The entire temperature program was carried out under nitrogen purge at a flow rate of 50 mL/min. All melting points were quantified using TA's Universal Analysis Software via the software linear peak integration function.

The volatile content of PPS samples was determined using the Volatiles Test, which was performed as follows. An aluminum boat containing about 3 g of a PPS sample was placed inside an 8 inch (20.3 cm) long glass tube having an inner diameter of 1 inch (2.54 cm) and a ground glass fitting on the open end. The glass tube was placed inside a tube furnace. The open end of the glass tube was connected to a U-shaped glass tube cooled in dry ice. The length of the U was about 4.5 inches (11.43 cm) from top to bottom. The glass tube and its contents were heated in the tube furnace under 60 mtorr vacuum to 320° C. and maintained at these conditions for 4 hours, during which time volatile components from the molten PPS were collected in the cooled U-shaped glass tube.

After 4 hours, the tube furnace was turned off and its contents allowed to cool. The PPS in the aluminum boat was removed from the glass tube. The glass tube from the furnace and the U-shaped glass tube with its contents were rinsed with chloroform; the rinses were combined. Triacontane was added as an internal standard to the chloroform solution. The PPS and the chloroform solution of collected volatiles were analyzed by GC FID or GCMS. The total amount of volatiles collected and the amounts of individual components such as phenol, thiophenol, and p-chlorothiophenol, and others, could be calculated using an internal standard method.

Example 1

Solution Processing of PPS with Reducing Agent and Base

This Example demonstrates solution phase processing of a polyphenylene sulfide sample using zinc metal as the reducing agent and sodium bicarbonate as the base to obtain a modified polyphenylene sulfide having improved thermal and thermo-oxidative stability. A PPS sample modified by 1 weight percent zinc and one weight percent sodium bicarbonate was prepared as follows. Fortron® 309 PPS (1 g), Zn (0.01 g), and sodium bicarbonate (0.01 g) were mixed with NMP (10 mL) in a 25 mL microwave tube manufactured from Type I, Class A (USP Type I) heavy-wall borosilicate glass and designed to withstand pressures up to 300 psi. The reaction vessel was sealed under air with aluminum seals containing installed blue PTFE-faced silicone septa and heated with stirring for two hours using a heating block that was pre-set at 250° C. A white solid was precipitated out from the solution by cooling the reaction mixture to room temperature. The resulting suspension was then filtered. The modified PPS was collected as a white solid, washed three times with NMP (10 mL/each), water (10 mL/each), and acetone (10 mL/each), and dried in a vacuum oven at 100° C. overnight.

DSC analysis was performed on the Fortron® 309 PPS starting material and the modified PPS sample obtained in Example 1. The DSC analysis was performed after the samples had been aged in an oven at 250° C. for 10 days under air. Table 1 shows the melting point of the PPS samples before and after the aging test. A greater retention of melting point (smaller decrease in melting point after aging) was observed for the PPS obtained by solution processing than for the Fortron® 309 PPS starting material. This indicates the greater thermo-oxidative stability of the modified PPS of Example 1 and suggests that less crosslinking occurred in the modified PPS.

Figure 2:
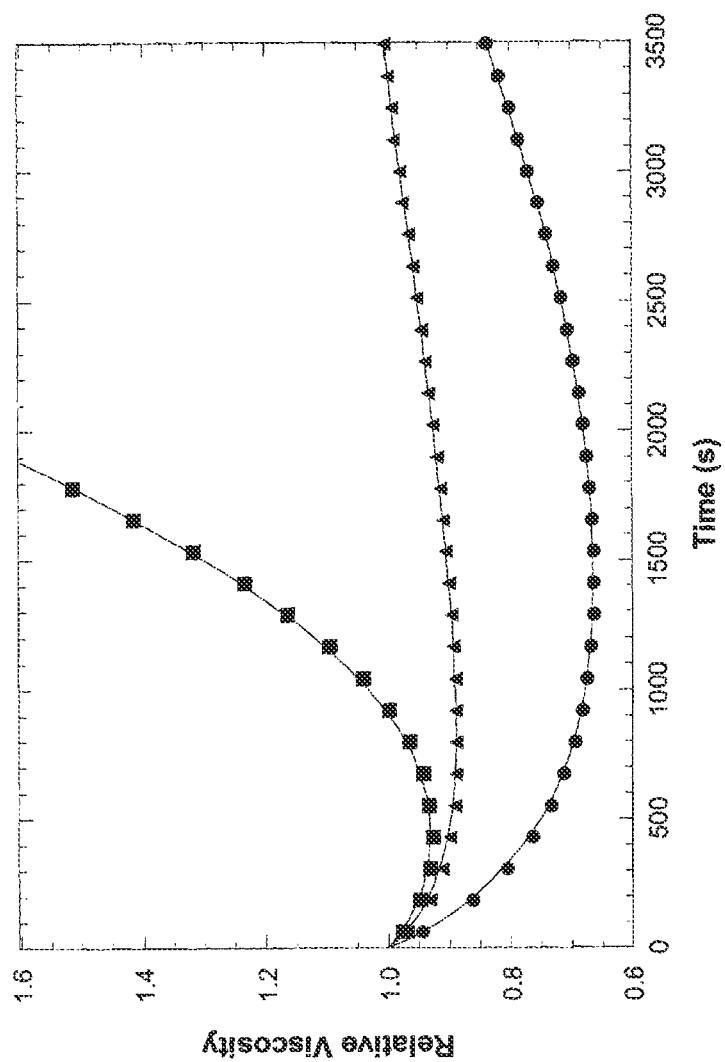
FIG. 2 is a graphical representation showing relative viscosity with time when heated under air for samples of commercially available PPS (shown as circles), modified PPS obtained similarly to the method of Example 1 (shown as triangles), and comparative PPS obtained similarly to the method of Comparative Example A (shown as squares).

FIGS. 1 and 2 show the results of rheology analysis to monitor viscosity changes during heating under nitrogen and under air for a sample of modified PPS prepared similarly to that of Example 1; results are discussed below.

Comparative Example A

PPS Control

Processing with No Reducing Agent and No Base

Comparative Example A shows the results of solution phase processing polyphenylene sulfide without a reducing agent and without a base. The procedure of Example 1 was followed using 3 g Fortron® 309 PPS and NMP (15 mL), but no zinc and no sodium bicarbonate.

The PPS obtained in this manner was aged in an oven at 250° C. for 10 days under air. Table 1 shows the melting point of this material before and after the aging test.

FIGS. 1 and 2 show the results of rheology analysis to monitor viscosity changes during heating under nitrogen and under air for a sample of PPS prepared similarly to that of Comparative Example A; results are discussed below.

Comparative Example B

Solution Processing of PPS with NaHCO₃ Only

No Reducing Agent

Comparative Example B shows the results of solution phase processing a polyphenylene sulfide sample with a base but without a reducing agent. The procedure of Example 1 was followed using 3 g Fortron® 309 PPS, 0.03 g NaHCO₃, and NMP (15 g), but no zinc.

The PPS obtained in this manner was aged in an oven at 250° C. for 10 days under air. Table 1 shows the melting point of this material before and after the aging test.

Example 2

Solution Processing of PPS with Zinc Metal, NaHCO₃, Zinc Stearate, and Tin Ethylhexanoate This Example demonstrates solution phase processing of a polyphenylene sulfide sample using zinc metal, sodium bicarbonate, zinc stearate, and tin ethylhexanoate to obtain a modified polyphenylene sulfide having improved thermal and thermo-oxidative stability. A PPS sample was prepared as described in Example 1 but using 3 g Fortron®309 PPS, 0.03 g zinc metal, 0.03 g sodium bicarbonate, 0.03 g zinc stearate, 0.03 g tin(II) ethylhexanoate, and NMP (15 g).

The PPS sample was aged in an oven at 250° C. for 10 days under air. Table 1 shows the melting point of this material before and after the aging test.

Example 3

Solution Processing of PPS with Zinc Stearate and Tin(II) Ethylhexanoate

This Example demonstrates solution phase processing of a polyphenylene sulfide sample using tin ethylhexanoate as both the reducing agent and the base and zinc(II) stearate as the additional compound comprising a metal having an affinity for sulfur to obtain a modified polyphenylene sulfide having improved thermal and thermo-oxidative stability. A PPS sample was prepared as described in Example 1 but using 3 g Fortron® 309 PPS, 0.03 g zinc(II) stearate, 0.03 g tin(II) ethylhexanoate, and NMP (15 g).

The PPS sample was aged in an oven at 250° C. for 10 days under air. Table 1 shows the melting point of this material before and after the aging test.

Example 4

Solution Processing of PPS with Zn Metal, NaHCO₃, Zinc Stearate and Bismuth(III) 2-Ethylhexanoate This Example demonstrates solution phase processing of a polyphenylene sulfide sample using zinc metal, sodium bicarbonate, zinc stearate, and bismuth(III) 2-ethylhexanoate to obtain a modified polyphenylene sulfide having improved thermal and thermo-oxidative stability. A PPS sample was prepared as described in Example 1 but using 3 g Fortron® 309 PPS, 0.03 g zinc metal, 0.03 g NaHCO₃, 0.03 g zinc(II) stearate, 0.03 g bismuth(III) 2-ethylhexanoate, and NMP (15 g).

The PPS sample was aged in an oven at 250° C. for 10 days under air. Table 1 shows the melting point of this material before and after the aging test.

Example 5

Solution Processing of PPS with Zinc Stearate and Bismuth(III) 2-Ethylhexanoate This Example demonstrates solution phase processing of a polyphenylene sulfide sample using bismuth(III) 2-ethylhexanoate as both the reducing agent and the base and zinc(II) stearate as the additional compound comprising a metal having an affinity for sulfur to obtain a modified polyphenylene sulfide having improved thermal and thermo-oxidative stability. A PPS sample was prepared as described in Example 1 but using 3 g Fortron® 309 PPS, 0.03 g zinc(II) stearate, 0.03 g bismuth(III) 2-ethylhexanoate, and NMP (15 g).

The PPS sample was aged in an oven at 250° C. for 10 days under air. Table 1 shows the melting point of this material before and after the aging test.

Example 6

Solution Processing of PPS with Zinc Metal

This Example demonstrates solution processing of a polyphenylene sulfide sample with a reducing agent and formation of base from the reducing agent. A PPS sample was prepared as described in Example 1 but using only 3 g Fortron® 309 PPS, 0.03 g zinc metal, and NMP (15 g). It is believed that zinc oxide was generated under the reaction conditions used.

The PPS sample was aged in an oven at 250° C. for 10 days under air. Table 1 shows the melting point of this material before and after the aging test.

TABLE 1

Results from DSC analysis of aged (under air at 250° C. for 10 days) PPS samples

| PPS Sample | Melting point before solid aging test (° C.) | Melting point after solid aging test (° C.) | Decrease in Melting Point due to aging (° C.) |
| --- | --- | --- | --- |
| Fortron ® 309 | 280 | 264 | 16 |
| Comparative Example A | 280 | 264 | 16 |
| Comparative Example B | 279 | 269 | 10 |
| Example 1 | 278 | 275 | 3 |
| Example 2 | 279 | 276 | 3 |
| Example 3 | 279 | 273 | 6 |
| Example 4 | 278 | 274 | 4 |
| Example 5 | 280 | 274 | 6 |
| Example 6 | 279 | 274 | 5 |

As the data in Table 1 shows, after being aged in air for 10 days at 250° C., the melting point of commercial Fortron® 309 PPS resin decreased 16 degrees from 280° C. to 264° C. One possible interpretation is that crosslinking was taking place in the PPS polymer during the ageing test. Treatment of PPS as described in Comparative Example A did not improve PPS stability as a similar 16 degree decrease in melting point was observed for this material. Treatment with base as described in Comparative Example B provided PPS having a smaller decrease in melting point after ageing (a 10 degree decrease, from 279° C. to 269° C.). Significantly better oxidative stability, demonstrated by better retention of melting points (smaller decreases in melting point) after the ageing test, was obtained for Example 1 through Example 6. The modified PPS compositions of Example 1 through Example 6 had a decrease in melting point after exposure to air for 10 days at 250° C. of less than 10° C. as measured by DSC analysis. In contrast, the PPS compositions of the Comparative Examples and the Fortron® 309 sample showed decreases in melting point of 10° C. or more after exposure to air under the same conditions.

Similar results can be seen in FIGS. 1 and 2. FIG. 1 shows the complex viscosity under nitrogen at 300° C. for Fortron® 309 PPS (shown as circles), a comparative PPS sample obtained similarly to the method of Comparative Example A (shown as squares), and a modified PPS sample obtained similarly to the method of Example 1 (shown as triangles) on a relative basis as a function of time. Thermal stability is indicated by relatively little change in viscosity with time and can be observed in the Figures as a largely flat, straight line, as seen by the plotted data for the modified PPS sample. In comparison, the plotted data for the non-modified PPS samples provide lines which have more curvature, reflecting changes in viscosity with time due to lower thermal stability of the non-modified PPS samples.

FIG. 2 shows the complex viscosity under air at 300° C. for Fortron® 309 PPS (shown as circles), a comparative PPS sample obtained similarly to the method of Comparative Example A (shown as squares), and a modified PPS sample obtained similarly to the method of Example 1 (shown as triangles) on a relative basis as a function of time. Thermo-oxidative stability is indicated by relatively little change in viscosity with time and can be observed in the Figures as a largely flat, straight line, as seen by the plotted data for the modified PPS sample. In comparison, the plotted data for the non-modified PPS samples provide lines which have more curvature, reflecting changes in viscosity with time due to lower thermo-oxidative stability of the non-modified PPS samples.

Comparative Example C

Dry Blending of Zinc Metal (0.98 Wt %) and Sodium Bicarbonate (1.1 wt %) with PPS Comparative Example C shows the results of dry blending polyphenylene sulfide in the solid phase with a reducing agent and a base. PPS containing 0.98 weight percent zinc metal and 1.1 weight percent sodium bicarbonate was prepared as follows. Fortron® 309 powder (97.92 parts) was added to a Waring blender having variable speed control. While the powder was mixing in the blender, zinc metal (0.98 part) and sodium bicarbonate (1.1 parts) were added. Blending continued for several minutes to ensure a homogenous mixture was obtained.

The PPS sample was analyzed by the 320 C air aging method Data are presented in the Table below.

TABLE 2

Results from DSC analysis of in situ aged (under air at 320° C. for 3 hours) PPS samples

| PPS Sample | Melting point of PPS before in situ aging test (° C.) | Melting point after aging (° C.) | Δ melting point (° C.) |
| --- | --- | --- | --- |
| Comparative Example C | 279 | 251 | 28 |
| Example 1 | 280 | 259 | 21 |

As the data in Table 2 shows, the dry blended PPS of Comparative Example C had a 28° C. decrease in melting point by DSC after in situ air ageing at 320° C. In contrast, the solution phase processed PPS of Example 1 showed better melting point retention with only a 21° C. decrease in melting point after ageing under the same conditions. This better melting point retention indicates the better stabilization efficacy of the solution phase processing method.

Example 7

Solution Processing of PPS with Reducing Agent and Base on a Larger Scale

This Example demonstrates solution phase processing of polyphenylene sulfide using zinc metal as the reducing agent and sodium bicarbonate as the base on a larger scale to obtain a modified polyphenylene sulfide having improved thermal and thermo-oxidative stability and reduced volatiles content.

In a 26 gallon jacketed pressure vessel equipped with a triple blade stirrer 45 Kg NMP, 6 Kg PPS Fortron® 309, 60 g NaHCO$_3$ and 60 g zinc powder were combined and stirred at a rate of 20 RPM under nitrogen. The vessel was evacuated to about 50 mbar and back-filled with nitrogen to atmospheric pressure three times. The reactor was closed and the temperature was raised to 240° C. and maintained for about 1 hour at about 22 psi pressure. Subsequently, the wall temperature of the reactor was set to 19° C., the temperature of the reaction mixture was allowed to reach 210° C. and 32 Kg of NMP were added over the course of 15 minutes. The slurry containing the modified PPS was stirred for one hour before it was discharged into a holding vessel.

The procedure was repeated two additional times. The three batches of modified PPS were combined and transferred into a stirred filter vessel (Zwag filter) and the mother liquor was filtered off by applying vacuum. The filter cake was washed three times with three parts of acetone and three times with three parts of water. Subsequent drying at 120° C. gave a white PPS power containing less than 50 ppm NMP and less than 400 ppm water. Three samples were taken from three of the batches and analyzed by the melt aging DSC method. The observed melt inflection points were 254° C., 255° C., and 256° C.

The modified PPS products from a total of 14 solution phase processing runs were combined. The total yield was about 87% (based on total weight of PPS used) and the zinc content was 0.8% as determined by standard ICP analysis. As shown in Table 3, the volatiles content was reduced from about 1045 ppm in the Fortron® 309 starting material to a range of about 90 to 130 ppm in the modified PPS, which is equivalent to a reduction of about 87%-91%. The individual amounts of phenol, thiophenol, and p-chlorothiophenol were also significantly reduced in the modified PPS. The total amount of phenol+thiophenol+p-chlorothiophenol was reduced from about 540 ppm in the starting material to less than about 50 ppm in the modified PPS. This significant reduction in the volatiles content is desired for improved polymer processing.

TABLE 3

Results of Volatiles Test

| Volatile Component | PPS powder Fortron ® 309 Volatiles in ppm | Example 7 volatiles in ppm |
|---|---|---|
| γ-Butyrolactone | 85 | 20 |
| Phenol | 210 | 30 |
| Thiophenol | 180 | <10 |
| p-Chlorothiophenol | 150 | <10 |
| 4-Mercaptodiphenylsulfide | 220 | <10 |
| 4-Chloro-4'-mercaptodiphenylsulfide | 170 | <10 |
| N-Methylpyrrolidone | 30 | 40 |
| Sum | 1045 | 90-130 |

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

Although particular embodiments of the present invention have been described in the foregoing description, it will be understood by those skilled in the art that the invention is capable of numerous modifications, substitutions, and rearrangements without departing from the spirit of essential attributes of the invention. Reference should be made to the appended claims, rather than to the foregoing specification, as indicating the scope of the invention.

What is claimed is:

1. A modified polyphenylene sulfide obtained by a method comprising the steps of:
   a) contacting, in the presence of a suitable solvent, a polyphenylene sulfide with at least one reducing agent and at least one base to form a first mixture, wherein the reducing agent comprises zinc(0), tin(0), tin(II), bismuth (0), bismuth(III), or a combination thereof, and the ratio of the reducing agent to the polyphenylene sulfide is from about 0.0001:1 to about 0.5:1 on a weight basis;
   b) heating the first mixture to a sufficient temperature and for a sufficient time to form a second mixture wherein the polyphenylene sulfide is dissolved in the solvent; and
   c) precipitating the dissolved polyphenylene sulfide from the second mixture to obtain a modified polyphenylene sulfide having improved thermo-oxidative stability relative to the thermo-oxidative stability of the polyphenylene sulfide of step a) measured under the same conditions.

2. The modified polyphenylene sulfide of claim 1 having a decrease in melting point after exposure to air for 10 days at 250° C. of less than 10° C. as measured by DSC analysis.

3. The modified polyphenylene sulfide of claim 1 having a volatile content which is at least 10% reduced in comparison to the volatile content of the polyphenylene sulfide before modification.

4. The modified polyphenylene sulfide of claim 1 containing 200 ppm or less of phenol+thiophenol+p-chlorothiophenol as determined using the Volatiles Test.

5. The modified polyphenylene sulfide of claim 1, wherein the base comprises bicarbonate, carbonate, hydroxide, oxide, sulfide, a carboxylate, or a mixture thereof.

6. The modified polyphenylene sulfide of claim 1, wherein the base comprises zinc(II), tin(II), bismuth(III), Li$^+$, Na$^+$, K$^+$, Rb$^+$, Cs$^+$, or a mixture thereof.

7. The modified polyphenylene sulfide of claim 1, wherein the solvent comprises N-methyl-2-pyrrolidone, 1-cyclohexyl-2-pyrrolidinone, or mixtures thereof.

8. The modified polyphenylene sulfide of claim 1, wherein the reducing agent comprises tin(II).

9. The modified polyphenylene sulfide of claim 1, wherein the reducing agent comprises zinc(0), the base comprises sodium bicarbonate, and the solvent comprises N-methyl-2-pyrrolidone.

10. The modified polyphenylene sulfide of claim 1, wherein in step a) the polyphenylene sulfide is additionally contacted with at least one compound comprising zinc(II), tin(II), tin(IV), bismuth(V), antimony(III), antimony(V), or a combination thereof, and wherein the ratio of the compound to the polyphenylene sulfide is from about 0.0001:1 to about 0.5:1 on a weight basis.

11. The modified polyphenylene sulfide of claim 10, wherein the compound comprises zinc(II), tin(II), or a combination thereof.

12. The modified polyphenylene sulfide of claim 1, wherein the method further comprises a step of compounding the modified polyphenylene sulfide with an additive comprising zinc(II), tin(II), or a combination thereof.

13. An article comprising the modified polyphenylene sulfide of claim 1.

14. The article of claim 13, wherein the article is a fiber, a felt, a bag filter, a nonwoven fabric, a film, a coating, or a molded part.

15. A method comprising the steps of:
a) contacting, in the presence of a suitable solvent, a polyarylene sulfide with at least one reducing agent and at least one base to form a first mixture, wherein the reducing agent comprises zinc(0), tin(0), tin(II), bismuth (0), bismuth(III), or a combination thereof, and the ratio of the reducing agent to the polyarylene sulfide is from about 0.0001:1 to about 0.5:1 on a weight basis;
b) heating the first mixture to a sufficient temperature and for a sufficient time to form a second mixture wherein the polyarylene sulfide is dissolved in the solvent; and
c) precipitating the dissolved polyarylene sulfide from the second mixture to obtain a modified polyarylene sulfide having improved thermo-oxidative stability relative to the thermo-oxidative stability of the polyarylene sulfide of step a) measured under the same conditions.

* * * * *